United States Patent
Kaneichi et al.

(10) Patent No.: US 11,107,095 B2
(45) Date of Patent: Aug. 31, 2021

(54) METHOD FOR DISPLAY CONTROL, DISPLAY CONTROL DEVICE, AND RECORDING MEDIUM

(71) Applicants: TOYOTA JIDOSHA KABUSHIKI KAISHA, Toyota (JP); JapanTaxi Co., Ltd., Chiyoda-ku (JP)

(72) Inventors: Daiki Kaneichi, Nissin (JP); Yuichi Komatsu, Yokohama (JP); Kiichi Ueta, Bunkyo-ku (JP)

(73) Assignees: TOYOTA JIDOSHA KABUSHIKI KAISHA, Toyota (JP); JapanTaxi Co., Ltd., Chiyoda-ku (JP)

( * ) Notice: Subject to any disclaimer, the term of this patent is extended or adjusted under 35 U.S.C. 154(b) by 39 days.

(21) Appl. No.: 16/655,923

(22) Filed: Oct. 17, 2019

(65) Prior Publication Data

US 2020/0134644 A1 Apr. 30, 2020

(30) Foreign Application Priority Data

Oct. 31, 2018 (JP) .............................. JP2018-205048

(51) Int. Cl.
*G06F 3/0481* (2013.01)
*G06Q 30/02* (2012.01)
(Continued)

(52) U.S. Cl.
CPC .......... *G06Q 30/0202* (2013.01); *G06T 3/40* (2013.01); *G06T 11/60* (2013.01); *G09G 5/373* (2013.01);
(Continued)

(58) Field of Classification Search
None
See application file for complete search history.

(56) References Cited

U.S. PATENT DOCUMENTS

| 8,599,013 B1* | 12/2013 | Baron, Sr. ............ G08B 27/005 340/539.28 |
| 2006/0112350 A1* | 5/2006 | Kato ...................... G06F 3/0485 715/781 |
| 2006/0161346 A1* | 7/2006 | Murakami ........... G09B 29/102 708/442 |

(Continued)

FOREIGN PATENT DOCUMENTS

| JP | 2009-9282 A | 1/2009 |
| JP | 5232298 B2 | 7/2013 |

(Continued)

OTHER PUBLICATIONS

Japanese Office Action dated Nov. 24, 2020 in Japanese Patent Application No. 2018-205048 (submitting partial English translation only), 2 pages.

*Primary Examiner* — Sultana M Zalalee
(74) *Attorney, Agent, or Firm* — Oblon, McClelland, Maier & Neustadt, L.L.P.

(57) ABSTRACT

A method for display control executed by a display control device includes: acquiring, by the display control device, demand prediction information regarding prediction of demand for allocation of a vehicle in a prediction target area in units of block numbers of the prediction target area; and displaying, by the display control device, the demand prediction information acquired by the display control device on a display unit in a state of being superimposed on a map in the units of block numbers of the prediction target area.

20 Claims, 6 Drawing Sheets

(51) Int. Cl.
*G06T 11/60* (2006.01)
*G06T 3/40* (2006.01)
*G09G 5/377* (2006.01)
*G09G 5/373* (2006.01)

(52) U.S. Cl.
CPC ....... *G09G 5/377* (2013.01); *G09G 2340/045* (2013.01); *G09G 2340/12* (2013.01); *G09G 2380/10* (2013.01)

(56) References Cited

U.S. PATENT DOCUMENTS

| | | | | |
|---|---|---|---|---|
| 2008/0231643 A1* | 9/2008 | Fletcher | ............... | G06T 17/05 345/661 |
| 2010/0023257 A1* | 1/2010 | Machino | ............ | G01C 21/3614 701/533 |
| 2011/0251784 A1* | 10/2011 | Eckstein | ................ | B60K 35/00 701/532 |
| 2012/0110513 A1* | 5/2012 | Gaertner | ................ | G06F 16/29 715/853 |
| 2013/0144831 A1* | 6/2013 | Atlas | ...................... | G06Q 10/06 706/50 |
| 2014/0011522 A1* | 1/2014 | Lin | ...................... | H04W 4/029 455/456.2 |
| 2014/0365934 A1* | 12/2014 | Moore | ............... | G01C 21/3664 715/769 |
| 2015/0094955 A1* | 4/2015 | Lee | ...................... | H04W 4/021 701/532 |
| 2017/0131112 A1* | 5/2017 | Ogawa | ............... | G01C 21/3667 |

FOREIGN PATENT DOCUMENTS

JP    2015-179333 A    10/2015
WO    WO 2010/123075 A1    10/2010

\* cited by examiner

METHOD FOR DISPLAY CONTROL, DISPLAY CONTROL DEVICE, AND RECORDING MEDIUM

INCORPORATION BY REFERENCE

The disclosure of Japanese Patent Application No. 2018-205048 filed on Oct. 31, 2018 including the specification, drawings and abstract is incorporated herein by reference in its entirety.

BACKGROUND

1. Technical Field

The present disclosure relates to a method for display control, a display control device, and a recording medium.

2. Description of Related Art

Japanese Patent Application Publication No. 2009-9282 (JP 2009-9282 A) discloses a technique for displaying information on prediction of demand for taxi allocation in preset mesh units.

SUMMARY

In the technique disclosed in JP 2009-9282 A, the information on prediction of demand for taxi allocation is displayed in mesh units set at the time when the demand is predicted. Accordingly, the prediction information is deviated from map information recognized by a driver. Hence, in the technique disclosed in JP 2009-9282 A, the driver is unable to recognize the demand prediction at any location on the map.

The present disclosure provides a method for display control, a display control device, and a recording medium of demand prediction information that make it possible to confirm prediction of demand for allocation of a vehicle at any location on a map.

A method for display control of demand prediction information executed by a display control device according to a first aspect of the present disclosure includes: acquiring, by the display control device, demand prediction information regarding prediction of demand for allocation of a vehicle in a prediction target area in units of block numbers of the prediction target area; and displaying, by the display control device, the demand prediction information acquired by the display control device on a display unit in a state of being superimposed on a map in the units of block numbers of the prediction target area.

In the above aspect, demand for allocation of the vehicle in the prediction target area may be predicted in the units of block numbers of the prediction target area. The demand prediction information regarding allocation of the vehicle in the prediction target area may be classified in the units of block numbers of the prediction target area.

In the above aspect, the method may further include displaying, by the display control device, the demand prediction information on the display unit in the state of being superimposed on the map in units of administrative districts other than the block numbers, in response to input of an operation input signal.

In the above aspect, the method may further include displaying, by the display control device, the demand prediction information in the state of being superimposed on the map in units of roads.

In the above aspect, the display control device may be configured to display, on the display unit, an icon indicating a required number of vehicles in the units of block numbers as the demand prediction information.

In the above aspect, the display control device may be configured to acquire the demand prediction information in accordance with an enlargement ratio or a reduction ratio of the map displayed on the display unit.

In the above aspect, the method may further include enlarging, by the display control device, the map displayed on the display unit when the vehicle enters into a specified area, a total value of a predicted number of occupied vehicles in the specified area is larger than a first prescribed value, and a chance level in the specified area is larger than a second prescribed value. The predicted number of occupied vehicles in the units of block numbers may be included in the demand prediction information.

In the above aspect, the chance level may be a difference between the total value and the number of vacant vehicles in the specified area.

A display control device of demand prediction information according to a second aspect of the present disclosure includes: a memory; and a processor including hardware, wherein the processor is configured to acquire demand prediction information regarding prediction of demand for allocation of a vehicle in a prediction target area in units of block numbers of the prediction target area; and display, on a display unit, the demand prediction information acquired by the processor in a state of being superimposed on a map in the units of block numbers of the prediction target area A non-transitory recording medium according to a third aspect of the present disclosure records a display control program of demand prediction information. The display control program causes a display control device to execute: acquiring demand prediction information regarding prediction of demand for allocation of a vehicle in a prediction target area in units of block numbers of the prediction target area; and displaying, on a display unit, the demand prediction information acquired by the display control device in a state of being superimposed on a map in the units of block numbers of the prediction target area.

The method for display control, the display control device, and the recording medium of the demand prediction information according to the present disclosure make it possible to confirm prediction of demand for vehicle allocation at any location on a map.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
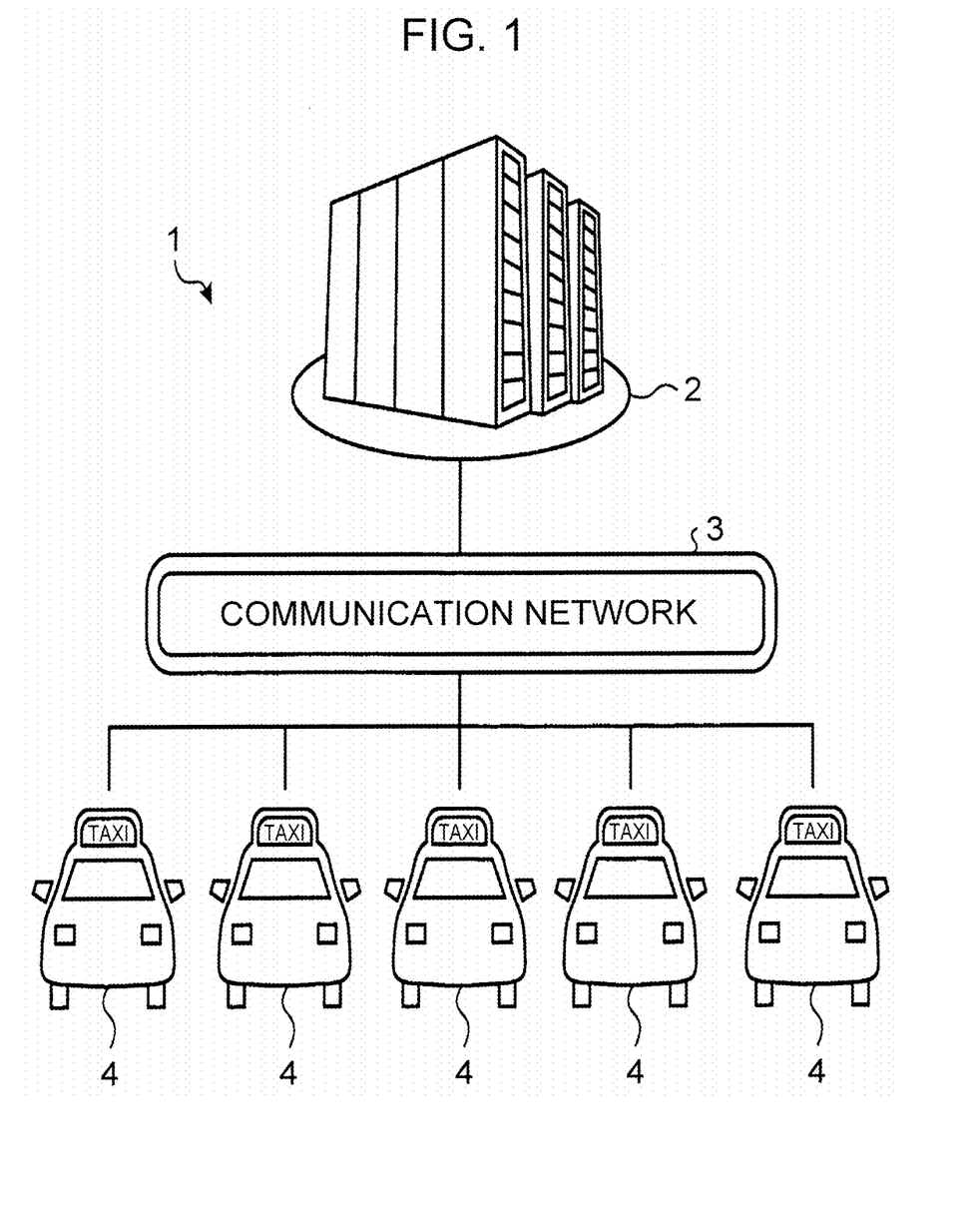
FIG. 1 is a schematic view showing the configuration of a vehicle allocation system of a present embodiment.
Figure 2:
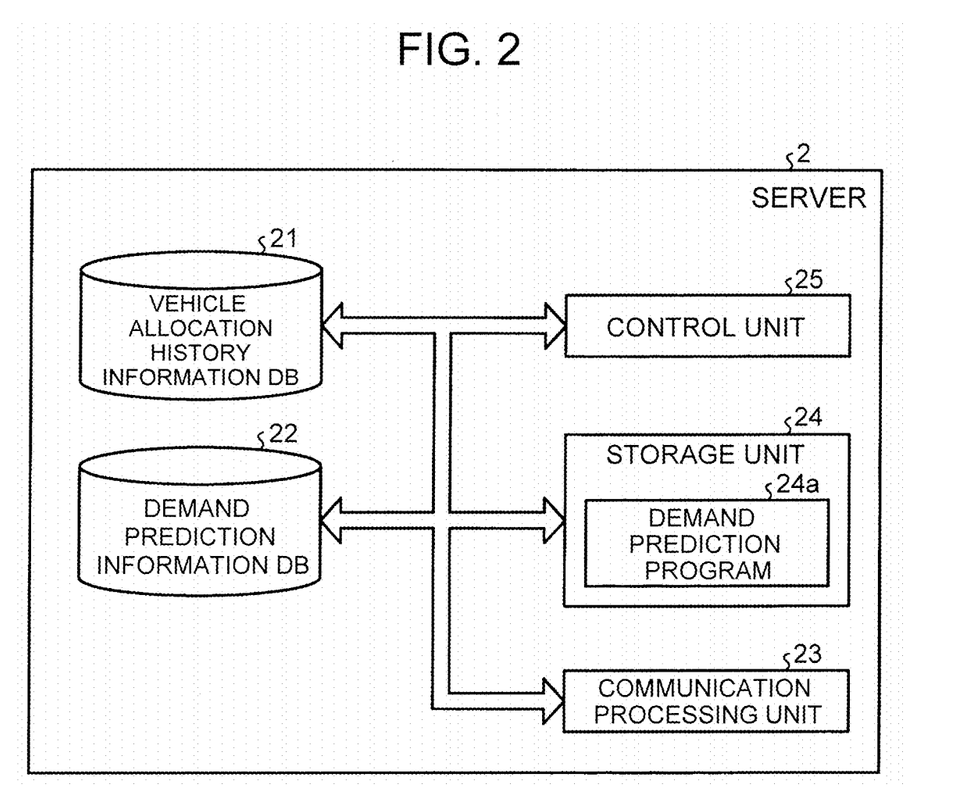
FIG. 2 is a block diagram showing the configuration of a server shown in FIG. 1.
Figure 3:
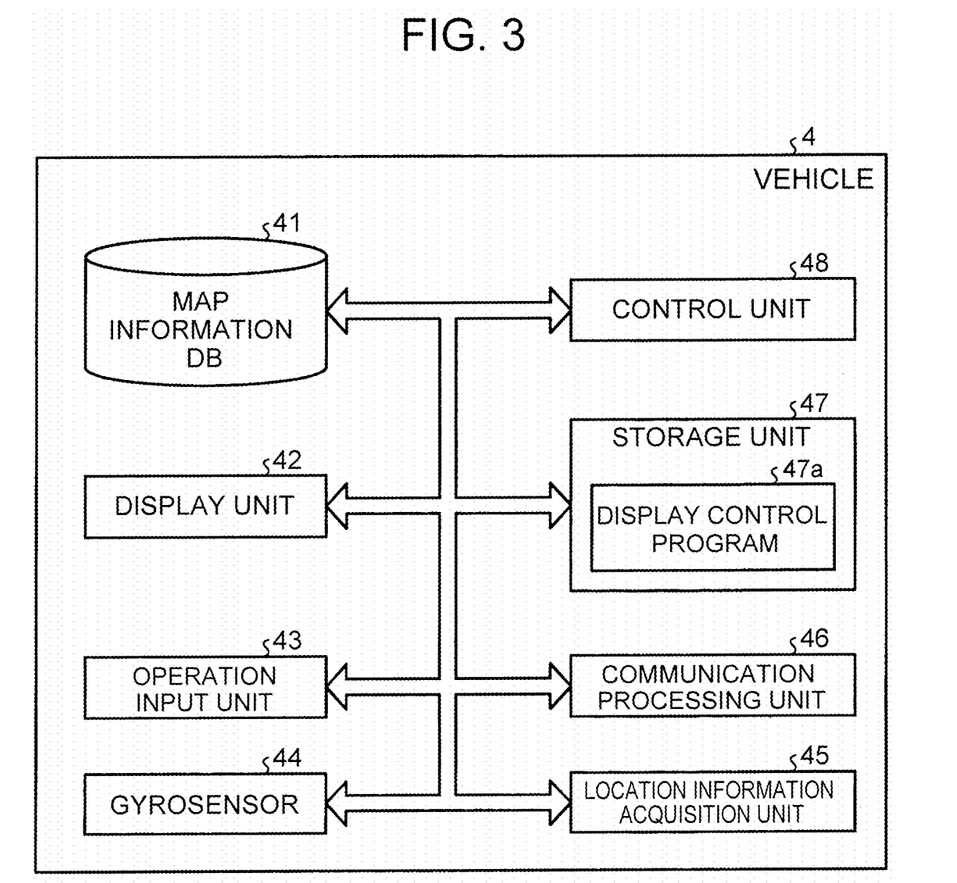
FIG. 3 is a block diagram showing the configuration of a vehicle shown in FIG. 1.

Hereinafter, a vehicle allocation system of an embodiment will be described with reference to the drawings.
Configuration First, the configuration of the vehicle allocation system of the embodiment will be described with reference to FIGS. 1 to 3. FIG. 1 is a schematic view showing the configuration of the vehicle allocation system of the present embodiment. FIG. 2 is a block diagram showing the configuration of a server 2 shown in FIG. 1. FIG. 3 is a block diagram showing the configuration of a vehicle 4 shown in FIG. 1.

As shown in FIG. 1, a vehicle allocation system 1 of the embodiment is an information processing system which enables efficient allocation of a vehicle by providing information (hereinafter, stated as demand prediction information) on prediction of demand for allocation of the vehicle, such as a taxis, to the driver of the vehicle. The vehicle allocation system 1 includes a server 2 and a plurality of vehicles 4 connected with the server 2 through a communication network 3, such as an Internet line network and a mobile phone line network, as main component members.

As shown in FIG. 2, the server 2 includes a vehicle allocation history information database (vehicle allocation history information DB) 21, a demand prediction information database (demand prediction information DB) 22, a communication processing unit 23, a storage unit 24, and a control unit 25. Note that the server 2 may be configured with a plurality of computers, or may be a crowd server.

The vehicle allocation history information DB 21 stores vehicle allocation history information including information on a location where allocation of the vehicle 4 is requested (such as latitude and longitude information, mesh information, and information on administrative districts (quarters), such as town names, and block numbers), and time information thereof, etc.

The demand prediction information DB 22 stores the demand prediction information generated in a readable format by the control unit 25 through the communication network 3.

The communication processing unit 23 is configured with a local area network (LAN) interface board, a wireless communication circuit for wireless communication, or the like. The communication processing unit 23 controls information and communication processing with the vehicles 4 through the communication network 3.

The storage unit 24 is configured with a recording medium fixed to a computer or other devices, or a recording medium removable from a computer or other devices. Examples of the recording medium fixed to the computer or other devices may include an erasable programmable ROM (EPROM), and a hard disk drive (HDD). Examples of the recording medium removable from a computer or other devices may include a universal serial bus (USB) memory, a flexible disk, a magneto-optical disk, a compact disc-read only memory (CD-ROM), a compact disc-rewritable (CD-RW), a digital versatile disc (DVD), a Blu-ray (registered trademark) disc (BD), a digital audio tape (DAT), an 8-mm tape, and a memory card. A solid state drive (SSD) is usable as both a recording medium fixed to a computer or other devices and a recording medium removable from a computer or other devices.

The storage unit 24 stores data such as an operating system, various computer programs, various tables, and various databases. In the present embodiment, the storage unit 24 stores a demand prediction program 24a that is a computer program describing a routine for generating demand prediction information, and data such as various unshown setting information for generating the demand prediction information. The demand prediction program 24a may be configured to be provided upon being downloaded via the communication network 3.

The control unit 25 includes a processor configured with a central processing unit (CPU), a digital signal processor (DSP), a field-programmable gate array (FPGA), or the like (illustration omitted). The control unit 25 also includes a memory (primary storage) configured with a random access memory (RAM), a read only memory (ROM), or the like (illustration omitted). The control unit 25 implements the functions conformable to prescribed purposes, by loading a computer program stored in the storage unit 24 to a work area of the primary storage, and executing the computer program such that respective component units are controlled through the execution of the computer program.

As shown in FIG. 3, the vehicle 4 includes a map information database (map information DB) 41, a display unit 42, an operation input unit 43, a gyrosensor 44, a position information acquisition unit 45, a communication processing unit 46, a storage unit 47, and a control unit 48.

The map information DB 41 stores map information. The map information includes information on the locations and shapes of roads (for example, the number of lanes of the roads, and types of the lanes, such as a fast lane and a slow lane), information on the location of intersections and junctions, information on rivers, channels, railway lines, and the like, and information on administrative districts, such as town names and block numbers. The vehicle 4 may be configured such that necessary map information is acquired and used through the communication network 3.

The display unit 42 is configured with a display device, such as a liquid crystal display and an organic electro luminescence (EL) display device, to visibly display various pieces of information in accordance with a display control signal from the control unit 48. Although the various pieces of information are visibly displayed in the present embodiment, the various pieces of information may be output by voice.

The operation input unit 43 is configured with an operation input device, such as a keyboard, a touch panel, a switch, and a microphone, to output to the control unit 48 an operation input signal indicating the content of an operation performed by a driver of the vehicle 4 in response to the operation of the driver.

The gyrosensor 44 acquires information on the direction of the vehicle 4 and outputs to the control unit 48 a signal indicating the acquired direction of the vehicle 4.

The position information acquisition unit 45 receives GPS signals distributed from three or more global positioning system (GPS) satellites going around a global orbit, and measures the position of the location of the vehicle 4 based on the received GPS signals. The position information acquisition unit 45 outputs an electrical signal indicating the measured position of the location of the vehicle 4 to the control unit 48.

The communication processing unit 46 is configured with a wireless communication circuit for wireless communication, or the like. The communication processing unit 46 controls information and communication processing with the server 2 through the communication network 3.

The storage unit 47 is configured like the storage unit 24 on the side of the server 2. The storage unit 47 stores data such as an operating system, various computer programs, various tables, and various databases. In the present embodiment, the storage unit 47 stores a display control program 47a that is a computer program describing a routine for display control of the various pieces of information on the display unit 42, and data such as various unshown setting information for display control of the various pieces of information on the display unit 42. The display control program 47a may be configured to be provided upon being downloaded via the communication network 3.

The control unit 48 is configured like the control unit 25 on the side of the server 2. The control unit 48 implements the functions conformable to prescribed purposes, by loading a computer program stored in the storage unit 47 to a work area of the primary storage, and executing the computer program such that respective component units are controlled through the execution of the computer program.

The thus-configured vehicle allocation system 1 enables the driver of the vehicle 4 to confirm prediction of demand for allocation of the vehicle 4 at any position on the map, when the control unit 48 of the vehicle 4 executes the display control process shown below. The operation of the control unit 48 when executing the display control process will be described below with reference to FIGS. 4 to 7.

Display Control Process

Figure 4:
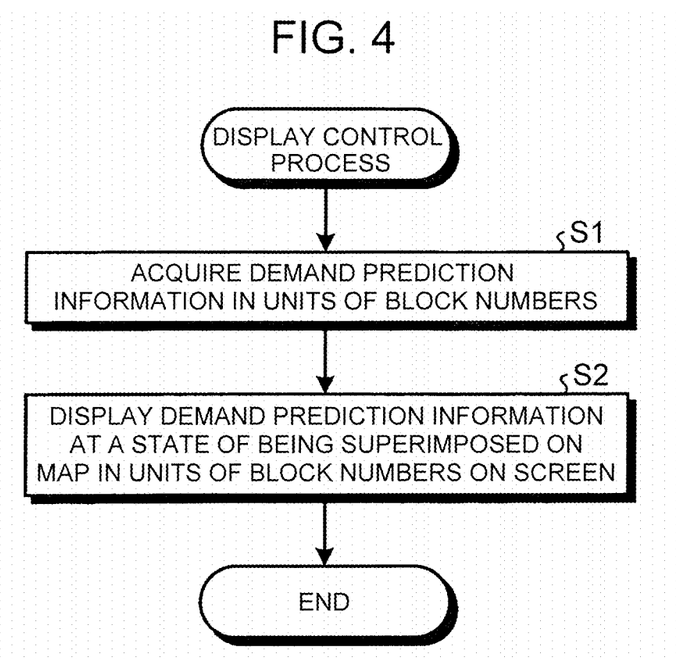
FIG. 4 is a flowchart showing the flow of a display control process of the embodiment.
Figure 5:
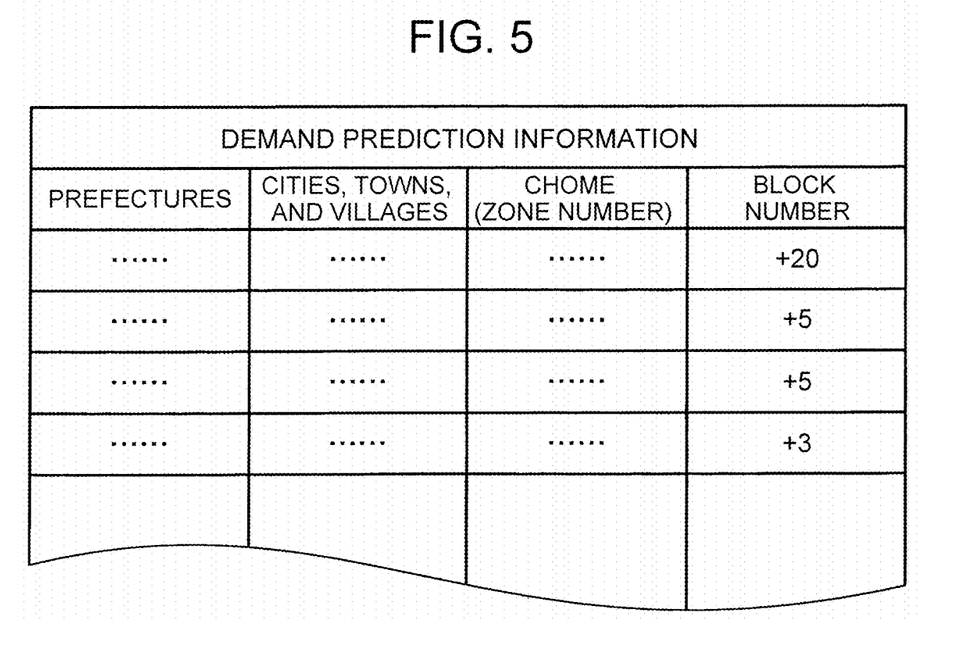
FIG. 5 shows an example of demand prediction information.
Figure 6:
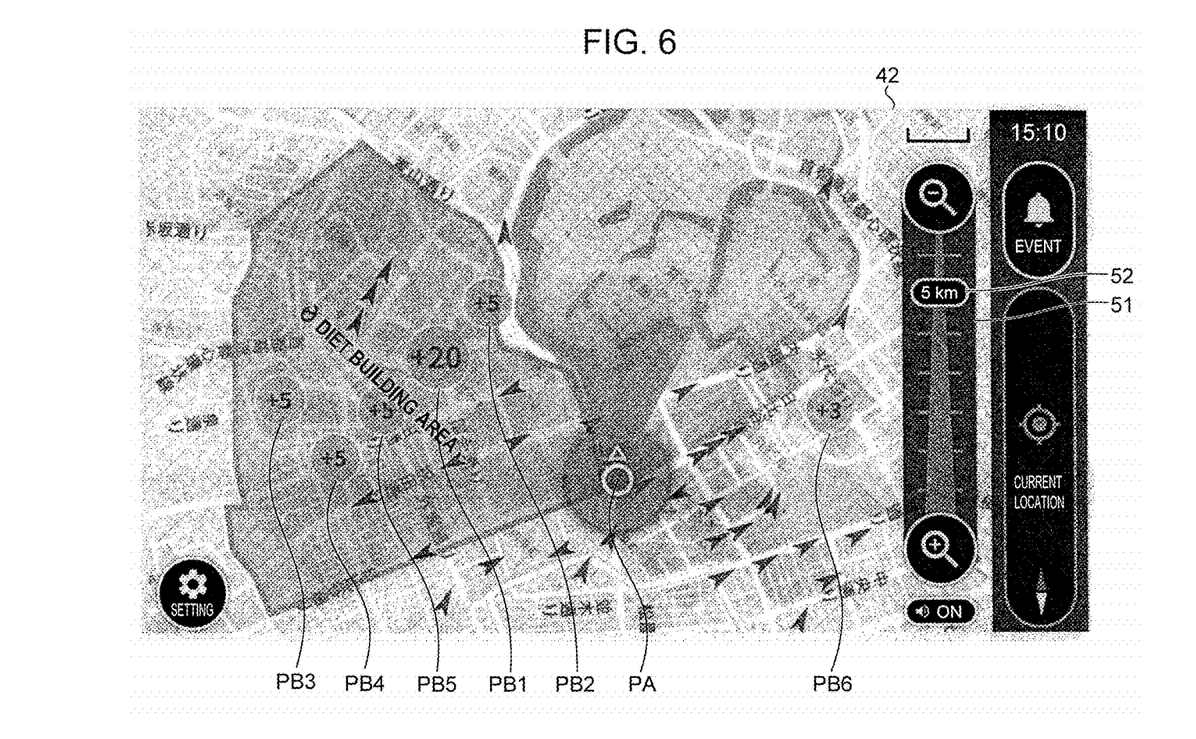
FIG. 6 shows a display example of the demand prediction information.
Figure 7:
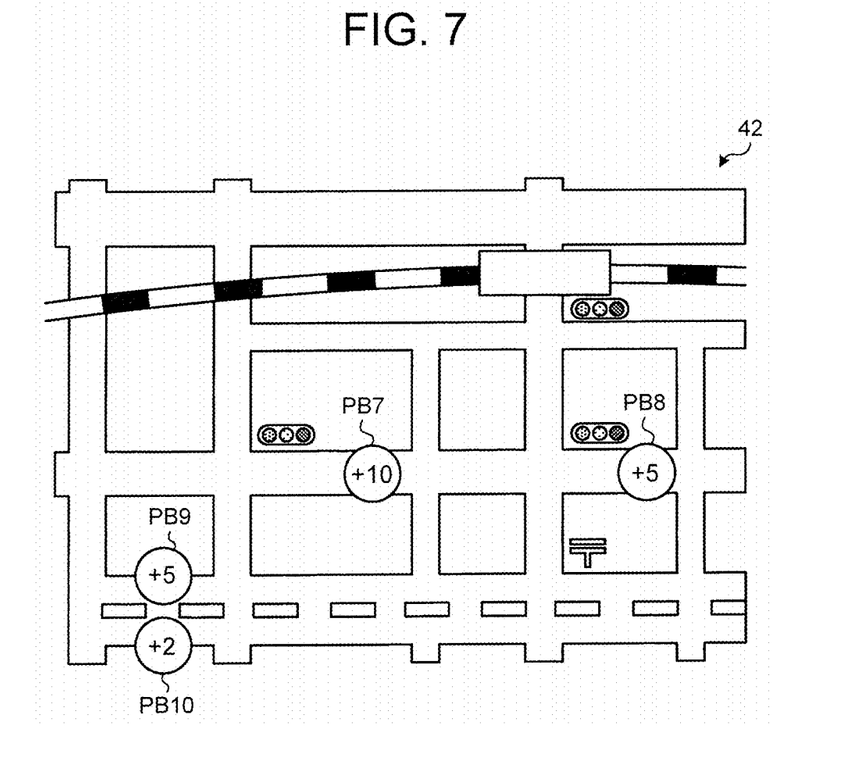
FIG. 7 shows a display example of the demand prediction information.

FIG. 4 is a flowchart showing the flow of a display control process of the embodiment. FIG. 5 shows an example of demand prediction information. FIGS. 6 and 7 show display examples of the demand prediction information.

The flowchart shown in FIG. 4 is started at the timing when the driver of the vehicle 4 operates the operation input unit 43 to instruct display of the demand prediction information on the display unit 42. Hence, the display control process proceeds to the process of step S1. The display control process is repeatedly executed for each prescribed control period until the end of the display control process is instructed. The function of the control unit 48 shown below is implemented when the control unit 48 executes the display control program 47a.

In the process of step S1, the control unit 48 acquires the demand prediction information around the vehicle 4 in units of block numbers as shown in FIG. 5. In the example of the demand prediction information shown in FIG. 5, the required number of the vehicles 4 is described in units of block numbers. Specifically, the demand prediction information DB 22 stores the demand prediction information in units of block numbers generated based on the vehicle allocation history information stored in the vehicle allocation history information DB 21, when the control unit 25 executes the demand prediction program 24a. Here, the control unit 25 may generate the demand prediction information in units of block numbers also with use of information on weather, events, or the like, other than the vehicle allocation history information.

First, the control unit 48 acquires the information on the direction of the vehicle 4 from the gyrosensor 44, and acquires the information on the location of the vehicle 4 from the position information acquisition unit 45. Next, the control unit 48 transmits the information on an area (prediction target area) on which the driver wants to acquire the demand prediction information, to the control unit 25 through the communication network 3 based on the acquired information. The control unit 25 reads the demand prediction information in units of block numbers corresponding to the prediction target area from the demand prediction information DB 22, and transmits to the control unit 48 the demand prediction information in units of block numbers read through the communication network 3.

Note that the control unit 48 may generate the demand prediction information in units of block numbers. The control unit 48 may acquire the demand prediction information around the vehicle 4 in units of block numbers, by acquiring from the demand prediction information DB 22 the demand prediction information on the prediction target area which is not classified in units of block numbers, and classifying the acquired demand prediction information in units of block numbers. Thus, the processing of step S1 is completed, and the display control process proceeds to step S2.

In the process of step S2, the control unit 48 reads the map information on the prediction target area from the map information DB 41, and displays the read map information as a map screen on the display unit 42 as shown in FIG. 6. The control unit 48 also displays a vehicle icon PA indicating the direction and location of the vehicle 4 at a corresponding location on the map screen in a superimposed manner, based on the information acquired from the gyrosensor 44 and the position information acquisition unit 45 in the process of step S1. The control unit 48 then displays the demand prediction information in units of block numbers acquired in the process of step S1 so as to be superimposed at a corresponding location on the map screen. In the map screen shown in FIG. 6, demand prediction icons PB1 to PB6 indicating the number of the vehicles 4 required per unit of block numbers are displayed so as to be superimposed at the corresponding locations on the map screen. According to such a map screen, the driver of the vehicle 4 can easily confirm the prediction of demand for allocation of the vehicle 4 at any location on a map screen as compared with the case where the demand prediction information is displayed in mesh units. Thus, the processing of step S2 is completed, and a series of the display control processes are ended.

In response to the driver using the operation input unit 43 to instruct expansion-reduction operation of the map screen by operating a manual operation button 52 (see FIG. 6) in an expansion-reduction icon 51 which is displayed so as to be superimposed on the map screen, the control unit 48 may display the demand prediction information so as to be superimposed on the map screen in units of administrative districts (cities, wards, towns, and villages) other than block numbers, in accordance with an enlargement ratio or a reduction ratio. In this case, the control unit 48 may acquire the demand prediction information regarding a corresponding area in accordance with the enlargement ratio or the reduction ratio from the server 2. Alternatively, the control unit 48 may generate the demand prediction information in accordance with the enlargement ratio or the reduction ratio with use of the demand prediction information acquired from the server 2. For example, the control unit 48 may acquire or generate more detail demand prediction information when the enlargement ratio is equal to or higher than a predetermined value than when the enlargement ratio is smaller than the predetermined value. This makes it possible to enhance the convenience of the operation of the driver to confirm the demand prediction information. The control unit 48 may automatically display an enlarged map screen, when the vehicle 10 drives into an area having a high demand (a predicted number of occupied vehicles is larger than a first prescribed value) and a high chance level (=predicted number of occupied vehicles−number of vacant vehicles) (where the chance level is larger than a second prescribed value set differently from the first prescribed value).

The server 2 may generate demand prediction information in units of roads or in units of lanes. As shown in FIG. 7, the control unit 48 may display the demand prediction information so as to be superimposed on the map screen in units of roads or in units of lanes. In the example shown in FIG. 7, demand prediction icons PB7, PB8 indicate the demand prediction information regarding the roads at the display position, and demand prediction icons PB9, PB10 indicate the demand prediction information regarding the lanes at the display position. In the example shown in FIG. 7, the demand prediction icons indicate the demand prediction information. However, links of the roads may each be classified by color to display the demand prediction information. Thus, the driver can easily confirm from which direction the driver should go to the location where the demand prediction is displayed. At the stage when the driver drives into a prediction target area, the demand prediction information may be displayed on a route along that the driver has passed before, in consideration of the preference of the driver.

What is claimed is:

1. A method for display control executed by a display control device, the method comprising:
    acquiring, by the display control device, demand prediction information regarding prediction of demand for allocation of a vehicle in a prediction target area in units of block numbers of the prediction target area;
    displaying, by the display control device, the demand prediction information acquired by the display control device on a display in a state of being superimposed on a map in the units of block numbers of the prediction target area; and
    enlarging, by the display control device, the map displayed on the display when the vehicle enters into a specified area where a total value of a predicted number of occupied vehicles is larger than a first prescribed value.

2. The method according to claim 1, wherein
    the demand for allocation of the vehicle in the prediction target area is predicted in the units of block numbers of the prediction target area, or
    the demand prediction information regarding allocation of the vehicle in the prediction target area is classified in the units of block numbers of the prediction target area.

3. The method according to claim 1, further comprising displaying, by the display control device, the demand prediction information on the display in the state of being superimposed on the map in units of administrative districts other than the block numbers, in response to input of an operation input signal.

4. The method according to claim 1, further comprising, displaying, by the display control device, the demand prediction information on the display, in the state of being superimposed on the map in units of roads.

5. The method according to claim 1, wherein the display control device is configured to display, on the display, an icon indicating a required number of vehicles in the units of block numbers as the demand prediction information.

6. The method according to claim 1, wherein the display control device is configured to acquire the demand prediction information in accordance with an enlargement ratio or a reduction ratio of the map displayed on the display.

7. The method according to claim 1, further comprising enlarging, by the display control device, the map displayed on the display when the vehicle enters into the specified area and a chance level in the specified area is larger than a second prescribed value,
    wherein the predicted number of occupied vehicles in the units of block numbers is included in the demand prediction information.

8. The method according to claim 7, wherein the chance level is a difference between the total value and a number of vacant vehicles in the specified area.

9. A display control device, comprising:
    a memory; and
    a processor including hardware, wherein
    the processor is configured to
        acquire demand prediction information regarding prediction of demand for allocation of a vehicle in a prediction target area in units of block numbers of the prediction target area;
        display, on a display, the demand prediction information acquired by the processor in a state of being superimposed on a map in the units of block numbers of the prediction target area; and
        enlarge the map displayed on the display when the vehicle enters into a specified area where a total value of a predicted number of occupied vehicles is larger than a first prescribed value.

10. The display control device according to claim 9, wherein
    the demand for allocation of the vehicle in the prediction target area is predicted in the units of block numbers of the prediction target area, or
    the demand prediction information regarding allocation of the vehicle in the prediction target area is classified in the units of block numbers of the prediction target area.

11. The display control device according to claim 9, wherein the processor is configured to display the demand prediction information on the display in the state of being superimposed on the map in units of administrative districts other than the block numbers, in response to input of an operation input signal.

12. The display control device according to claim 9, wherein the display control device is configured to display, on the display, the demand prediction information in the state of being superimposed on the map in units of roads.

13. The display control device according to claim 9, wherein the processor is configured to display, on the display, an icon indicating a required number of vehicles in the units of block numbers as the demand prediction information.

14. The display control device according to claim 9, wherein the processor is configured to acquire the demand prediction information in accordance with an enlargement ratio or a reduction ratio of the map displayed on the display.

15. The display control device according to claim 9, wherein
    the processor is configured to enlarge the map displayed on the display when the vehicle enters into the specified area and a chance level in the specified area is larger than a second prescribed value, and
    the predicted number of occupied vehicles in the units of block numbers is included in the demand prediction information.

16. The display control device according to claim 15, wherein the chance level is a difference between the total value and a number of vacant vehicles in the specified area.

17. A non-transitory recording medium storing a program, wherein
the program causes a display control device to execute:
acquiring demand prediction information regarding prediction of demand for allocation of a vehicle in a prediction target area in units of block numbers of the prediction target area;
displaying, on a display, the demand prediction information acquired by the display control device in a state of being superimposed on a map in the units of block numbers of the prediction target area; and
enlarging the map displayed on the display when the vehicle enters into a specified area where a total value of a predicted number of occupied vehicles is larger than a first prescribed value.

18. The recording medium according to claim 17, wherein
the demand for allocation of the vehicle in the prediction target area is predicted in the units of block numbers of the prediction target area, or
the demand prediction information regarding allocation of the vehicle in the prediction target area is classified in the units of block numbers of the prediction target area.

19. The recording medium according to claim 17, wherein the program causes the display control device to execute displaying the demand prediction information on the display in the state of being superimposed on the map in units of administrative districts other than the block numbers, in response to input of an operation input signal.

20. The recording medium according to claim 17, wherein the program causes the display control device to further execute displaying the demand prediction information on the display in the state of being superimposed on the map in units of roads.

* * * * *